United States Patent
Boden

[15] 3,684,152
[45] Aug. 15, 1972

[54] WELDING WIRE ADVANCING UNIT
[72] Inventor: Knut Folke Ingemar Boden, Laxa, Sweden
[73] Assignee: Elektriska Svetsningsaktiebolaget, Gothenburg, Sweden
[22] Filed: April 21, 1970
[21] Appl. No.: 30,386

[30] Foreign Application Priority Data

April 25, 1969 Switzerland..............5885/69

[52] U.S. Cl. .................................228/41, 226/168
[51] Int. Cl. .............................................B23k 1/00
[58] Field of Search ......214/338, 339; 226/181, 168; 228/33, 41

[56] References Cited

UNITED STATES PATENTS

| | | | |
|---|---|---|---|
| 1,966,200 | 7/1934 | Eskilson | 228/41 X |
| 3,014,519 | 12/1961 | Wright | 214/338 X |
| 3,265,276 | 8/1966 | Roffelsen | 228/41 X |
| 3,360,648 | 12/1967 | Cornish et al | 226/168 X |

*Primary Examiner*—John F. Campbell
*Assistant Examiner*—R. J. Craig
*Attorney*—Cameron, Kerkam & Sutton

[57] ABSTRACT

A wire advancing unit of the type in which the feed rolls are set at an angle to the wire and revolve about the axis of the wire. The feed roll axles are supported by a pair of rotor members which are angularly displaceable with respect to each other, spring means being provided to urge said rotor members in a direction causing the feed rolls to approach the common axis of rotation of the rotor members.

5 Claims, 4 Drawing Figures

PATENTED AUG 15 1972  3,684,152
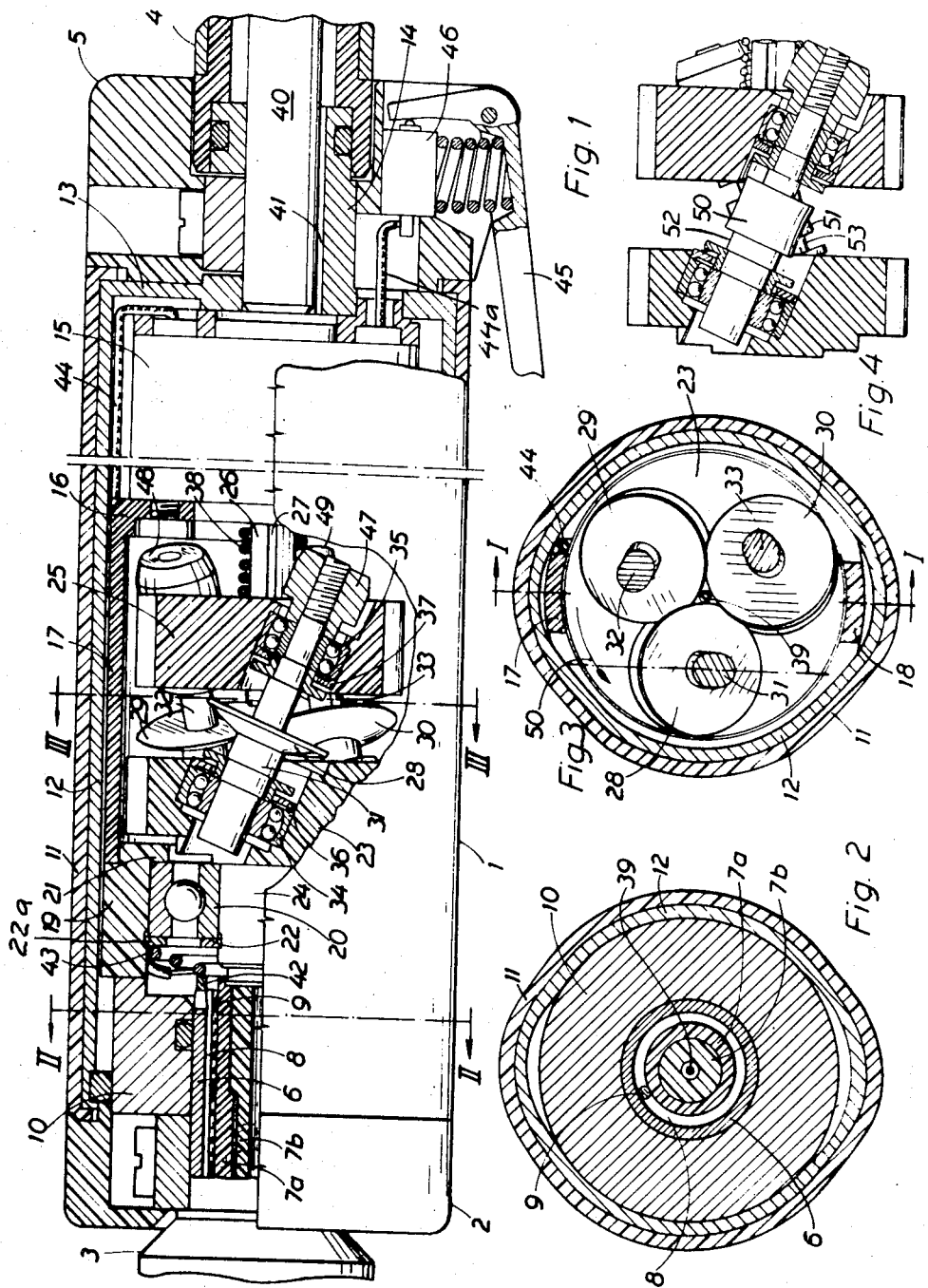
INVENTOR
KNUT FOLKE INGEMAR BODEN
BY
Cameron, Kerkam & Sutton
ATTORNEYS

WELDING WIRE ADVANCING UNIT

This invention relates to a welding wire advancing unit. More particularly, the invention relates to a welding wire advancing unit of the type in which two or more wire advancing rolls are adapted to perform a planetary motion about the axis of the wire, the axis of rotation of each of the rolls being set at an acute angle to the wire axis in order to make the point of engagement of each of the rolls with the wire during the planetary motion describe a helical path on the surface of the wire, whereby the wire is advanced axially with respect to the advancing rolls.

In previous advancing units of this type, manual adjustment members such as set screws are provided for the adaptation of the unit to different wire diameters and for the adjustment of the pressure exerted by the advancing rolls upon the wire.

It is an object of the invention to provide a welding wire advancing unit of the type above specified which adapts itself automatically to different wire diameters and which automatically provides the required roll pressure. Another object is the provision of a wire advancing unit of the type specified with means for automatically equalizing the radii of the orbits of the individual wire advancing rolls.

The welding wire advancing unit according to the invention generally comprises a body or housing, a pair of axially spaced rotor members mounted for rotation about a common axis in said body or housing, at least two roll axles and a roll on each of said axles, means for making each of said roll axles span the gap between said rotor members comprising, in each of the rotor members and for each of the roll axles, a roll axle supporting member and movable joint means retaining said roll axle supporting member in the rotor member, said movable joint means being adapted to permit angular displacement of said roll axle supporting member in relation to said rotor member in any plane through the roll axis, said supporting members and their respective joints being uniformly spaced about the axis of each of the rotor members, spring means actuating at least one of said rotor members and tending to cause a relative angular displacement of said rotor members and a corresponding increase of the angle between each of the roll axles and the rotor axis, means including a motor for rotating one of said rotor members, a first wire guiding means adapted to guide the wire towards the rolls, and, a second wire guiding means adapted to receive the wire emerging from between the rolls, said first and second wire guiding means being substantially coaxial with the rotor axle.

The invention will now be described in more detail with reference to the accompanying drawings exemplifying the invention.

FIG. 1 is a side view, partly in section on the line I—I of FIG. 2, of a wire advancing unit forming part of a welding gun;

FIG. 2 is a cross-sectional view taken on the line II—II of FIG. 1;

FIG. 3 is a cross-sectional view taken on the line III—III of FIG. 1; and

FIG. 4 is a sectional view showing the rotor members and roll axles of a modified embodiment of the invention.

The wire advancing unit illustrated in FIGS. 1–3 has a tubular body or housing 12 provided on its outside with an insulating coating 11 and constituting the handle portion 1 of a welding gun for consumable-electrode gas-shielded arc welding. For convenience of handling, said body or housing has a slightly out-of-circular cross-sectional shape (FIGS. 2 and 3). The body or housing 12 is provided at one end with an end fitting 2 adapted to receive the connecting plug 3 of a welding cable, and at the other end with an end fitting 5 into which the barrel portion 4 of the gun is detachably fitted. The connecting plug 3 is provided with a tubular member 6 serving to transmit the welding current to a contact block 10 attached to the body 12. The connecting plug also comprises a pair of coaxial tubular members 7a, 7b of electrically insulating material. The inner member 7b constitutes a wire guide, while the annular space 8 between the outer member 7a and the tubular member 6 constitutes a shielding gas passage and also contains a control current conductor 9. The welding current is transmitted to the tubular wire guide member 40 of the barrel portion 4 by means of a contact sleeve 14 integral with a front wall 13 of the tubular body 12. The shielding gas supplied through the annular space 8 fills the entire space contained within the tubular body 12 and escapes from said space into the barrel portion 4 through a groove 41 provided in the contact sleeve 14.

The wire advancing mechanism contained within the tubular body 12 comprises a pair of axially spaced rotor members 23, 25 adapted to rotate about a common axis coinciding with the longitudinal axis of the body 12. The rotor member 23 has a shaft 24 fitted in the inner sleeve of a ball bearing 20 the outer sleeve of which is fitted into an annular supporting member 19, retaining rings 22, 22a being provided to maintain said inner and outer sleeves in engagement with the rotor member 23 and with a flange 21 on the supporting member 19, respectively. The rotor member 25 is axially slidably fitted on the shaft 26 of an electric motor 15 mounted in the body 12, the rotation of said shaft being transmitted to the rotor member 25 by a follower pin (not visible in the drawing) engaging a groove 27 in the shaft 26. A member 16 attached to the housing of the motor 15 is provided with a pair of axial extensions 17, 18 the ends of which abut against a shoulder on the annular member 19 which is rigidly held against axial displacement by the contact block 10 on one side and the members 17, 18 on the other side.

The shaft 24 of the rotor member 23 as well as the motor shaft 26 are provided with central bores serving as wire guides.

The rotor members 23, 25 are connected by three roll axles 31, 32, 33, each of which is provided with a roll 28, 29, 30 integral with or otherwise rigidly connected with the axle. The axles are journalled in ball bearings in both of the rotor members, the bearings 34, 35 of one roll axle 31 being represented in cross-section. Sealing rings 36, 37 are provided to protect the ball bearings against dust and dirt. The bearings provided in each of the rotor members are uniformly spaced about the axis of rotation of the rotor member. The inner sleeves of the ball bearings are non-slidably fitted on their respective roll axles, and the outer sleeves of the ball bearings are non-slidably fitted in the rotor members. The ball bearings are of the spherical type and therefore allow some angular deviation of the axis of the inner sleeve from the axis of the outer sleeve. Each of the bearings, consequently, combines the function of a bearing with the function of a movable joint allowing angular displacement of the roll axle with respect to the rotor member in any plane through the roll axis.

The rotor member 25 is actuated by a compression spring 38 urging the rotor member 25 towards the other rotor member 23. Owing to the connection of the rotor members 25, 23 formed by the roll axles and the spherical ball bearings, any movement of the rotor member 25 towards the rotor member 23 will cause an angular adjustment of one rotor member with respect to the other rotor member and a corresponding increase of the angle between each of the roll axles 31, 32, 33 and the axis of rotation of the rotor members, combined with a movement of each of the rolls 28, 29, 30 towards the axis of rotation of the rotor members. Consequently, the rolls 28, 29, 30 will be maintained in permanent engagement with the wire under the action of the thrust exerted by the compression spring upon the rotor member 25.

The motor 15 is energized by a circuit including the control current conductor 9 of the connecting plug 3, an annular contact member 42, a contact spring 43, a conductor 44, the winding of the motor 15, a conductor 44a, a switch 46 controlled by the lever 45, and the contact sleeve 14 electrically connected to the welding cable. The arrow 50 (FIG. 3) indicates the direction of the rotation imparted by the motor shaft to the rotor member 25 and, consequently, to the entire system comprising both of the rotor members and the roll axles supported therein. THe revolving motion thus imparted to the roll axles causes each of the rolls to describe a helical path on the surface of the wire, whereby the wire is advanced towards the right in FIG. 1 along the path defined by the tubular member 7b, the bore of the shaft 24, the rolls 28, 29, 30, the bore of the motor shaft 26, and the wire guide member 40.

During the rotation of the system, each of the rolls 28 to 30 are subjected to the action of a centrifugal force tending to reduce the pressure with which the rolls engage the wire. To ensure that said pressure remains adequate at any rate of rotation, each of the roll axles 31, 32, 33 is extended beyond its bearing in the rotor member 25, the extended portion supporting a counterweight 47, 48, 49, respectively. The centrifugal force provided by said counterweights tends to move the rolls 28 to 30 inwards, thus counteracting the centrifugal force provided by the rolls themselves. In the embodiment illustrated, the counterweights are adapted to provide some over-compensation of said centrifugal force, whereby the pressure exerted by each of the rolls upon the surface of the wire is caused to increase with the rate of rotation of the wire advancing system and, consequently, with the rate of advancement of the wire.

In the modified embodiment illustrated in FIG. 4, two roll axles 52, 53 only are provided. The surface of each of the rolls 50, 51 is slightly concave in order to improve the grip on the wire. More particularly, the surface constitutes a hyperboloid.

The embodiment described may be modified in many ways, some of which are briefly mentioned below:

a. Each of the rolls is supported on its axle by an individual bearing, and the spherical ball bearings supporting the roll axles in the rotor members are replaced by ordinary joints, for instance ball-and-socket joints or gimbal joints.

b. The pressure spring 38 is replaced by a torsion spring adapted to rotate with the rotary system and to actuate both of the rotor members in opposite angular directions.

c. Both of the rotor members are axially stationary with respect to each other; the roll axle bearings in one of the rotor members are adapted to support their respective roll axles slidably in order to permit the required angular adjustability of the rotor members with respect to each other. The spring means has to be a torsion spring, as indicated in Point (b) above.

d. The electric motor 15 is replaced by a motor of any other suitable type, for instance a pneumatic motor controlled by suitable valve means replacing the switch 46.

e. Manually operable means are provided to shift the rotor members apart to facilitate the insertion of the wire between the rolls.

Various other modifications will readily suggest themselves to anybody skilled in the art.

I claim:

1. A welding wire advancing unit comprising
a body or housing,
a pair of axially spaced rotor members mounted for rotation about a common axis in said body or housing,
at least two roll axles and a roll on each of said axles,
means for making each of said roll axles span the gap between said rotor members comprising, in each of the rotor members and for each of the roll axles, a roll axle supporting member in the rotor member, said movable joint means being adapted to permit angular displacement of said roll axle supporting member with respect to said rotor member in any plane through the roll axis, said supporting members and their respective joints being uniformly spaced about the axis of each of the rotor members,
spring means actuating at least one of said rotor members and tending to cause a relative angular displacement of said rotor members and a corresponding increase of the angle between each of the roll axles and the rotor axis,
means including a motor for rotating one of said rotor members,
a first wire guiding means adapted to guide the wire towards the rolls, and
a second wire guiding means adapted to receive the wire emerging from between the rolls, said first and second wire guiding means substantially coaxial with the rotor axis, at least one of the roll axles being non-slidably retained by both of its supporting members, and at least one of the rotor members being axially slidable in respect of the other rotor member.

2. A wire advancing unit as claimed in claim 1 in which the spring means is a compression spring urging the axially slidable rotor member towards the other rotor member.

3. A wire advancing unit as claimed in claim 1 in which the rotor member driven by the motor is supported by the motor axles, said axle being hollow and constituting one of said wire guiding means.

4. A wire advancing unit as claimed in claim 1 in which each of the roll axles has a portion extending beyond one of the roll axle supporting members and is fitted with a counterweight supported by said portion.

5. A wire advancing unit comprising
a body or housing,
a pair of axially spaced rotor members mounted for rotation about a common axis in said body or housing, at least one of said rotor members being axially slidable in relation to the other rotor member,
a compression spring urging said slidable rotor member towards the other rotor member,
at least two roll axles and a roll rigidly connected with each of said roll axles,
a spherical bearing in each of said rotor members for each of said roll axles, each of said bearings comprising an outer sleeve fitted in the rotor member and an inner sleeve non-slidably engaging the roll axle, said spherical bearings being equally spaced about the axis of the rotor member,
means including a motor for rotating one of said rotor members,
wire guiding means adapted to guide the wire towards the rolls, and
wire guiding means adapted to receive the wire emerging from between the rolls, said first and second wire guiding means being substantially coaxial with the rotor axis.

* * * * *

PO-1050
(5/69)

UNITED STATES PATENT OFFICE
CERTIFICATE OF CORRECTION

Patent No. 3,684,152      Dated August 15, 1972

Inventor(s) Knut Folke Ingemar Boden

It is certified that error appears in the above-identified patent and that said Letters Patent are hereby corrected as shown below:

[30]: "Switzerland" should be --Sweden--. Col. 4, line 39, after "member" insert -- and movable joint means retaining said roll axle supporting member -- .

Signed and sealed this 20th day of March 1973.

(SEAL)
Attest:

EDWARD M. FLETCHER, JR.
Attesting Officer

ROBERT GOTTSCHALK
Commissioner of Patents